(12) United States Patent
Savage

(10) Patent No.: US 8,463,732 B2
(45) Date of Patent: Jun. 11, 2013

(54) STORAGE OF STOCHASTIC INFORMATION IN STOCHASTIC INFORMATION SYSTEMS

(76) Inventor: Sam L. Savage, Palo Alto, CA (US)

( * ) Notice: Subject to any disclaimer, the term of this patent is extended or adjusted under 35 U.S.C. 154(b) by 956 days.

(21) Appl. No.: 12/318,644

(22) Filed: Jan. 5, 2009

(65) Prior Publication Data

US 2009/0177611 A1      Jul. 9, 2009

Related U.S. Application Data

(60) Provisional application No. 61/006,300, filed on Jan. 4, 2008.

(51) Int. Cl.
*G06N 5/02* (2006.01)
*G06F 17/10* (2006.01)

(52) U.S. Cl.
USPC .......................................................... 706/52

(58) Field of Classification Search
None
See application file for complete search history.

(56) References Cited

U.S. PATENT DOCUMENTS

| 2007/0260435 | A1* | 11/2007 | Matsunaga et al. ............... 703/2 |
| 2007/0265811 | A1 | 11/2007 | Chalasani et al. |
| 2007/0299638 | A1 | 12/2007 | Tantawi |

OTHER PUBLICATIONS

Gray et al. "Quantization", IEEE Transaction on Information Theory, vol. 44, No. 6, 1998, pp. 2325-2383.*
Welch et al. "A Technique for High-Performance Data Compression", Computer, vol. 17, No. 6, 1984, pp. 8-19.*
Eriksson et al. "Pitch Quantization in Low Bit-Rate Speech Coding", IEEE, 1999, pp. 489-492.*
International Preliminary Report on Patentability and Written Opinion of the International Searching Authority dated Jul. 15, 2010 for PCT/US2009/000014.

* cited by examiner

*Primary Examiner* — Li-Wu Chang
(74) *Attorney, Agent, or Firm* — Steptoe & Johnson LLP

(57) ABSTRACT

A stochastic information system stores a coherent stochastic model corresponding to an uncertain variable in a data store. The coherent stochastic model is stored in a compressed format. The stochastic information system includes a calculation engine operable to calculate a result by performing a simulation using the coherent stochastic model. In some implementations, the stochastic data is encoded and stored as a single element, such as, for example, a string. The stochastic data may be encoded using a quantizer, which may be configured to exploit gaps in the stochastic data. A method includes receiving stochastic information including values for a plurality of trials for use in a stochastic information system, encoding the stochastic information as a string representing the values for the plurality of trials, and storing the encoded stochastic information for use by the stochastic information system.

21 Claims, 5 Drawing Sheets

FIG. 3A

| Trial | % Change in S&P 500 |
|---|---|
| 1 | 123% |
| 2 | 79% |
| 3 | 104% |
| 4 | 132% |
| 5 | 98% |
| 6 | 65% |
| 7 | 144% |

FIG. 3B

| Bins |
|---|
| A |
| B |
| C |
| D |

FIG. 3C

| Bins | Value |
|---|---|
| A | 65% to 85% |
| B | 85% to 105% |
| C | 105% to 125% |
| D | 125% to 145% |

FIG. 3D

| Trial | % Change in S&P 500 | Bin |
|---|---|---|
| 1 | 123% | C |
| 2 | 79% | A |
| 3 | 104% | B |
| 4 | 132% | D |
| 5 | 98% | B |
| 6 | 65% | A |
| 7 | 144% | D |

"CABDBAD"

FIG. 3E

| Week 0 | Week 1 | Week 2 | Week 3 | Week 4 | Week 5 | Week 6 | Week 7 | Week 8 | Week 9 | Week 10 | Week 11 | Week 12 |
|---|---|---|---|---|---|---|---|---|---|---|---|---|
| 85.00 | 84.60 | 85.71 | 86.70 | 84.63 | 85.25 | 84.57 | 84.81 | 85.13 | 85.10 | 79.96 | 80.37 | 79.73 |
| 85.00 | 85.62 | 85.17 | 83.36 | 85.62 | 83.33 | 78.33 | 81.66 | 81.06 | 80.09 | 79.96 | 79.84 | 78.35 |
| 85.00 | 87.36 | 84.00 | 83.56 | 81.68 | 86.52 | 89.56 | 88.01 | 92.35 | 93.44 | 89.92 | 85.89 | 83.27 |
| 85.00 | 82.56 | 78.41 | 76.59 | 77.24 | 77.28 | 78.02 | 76.54 | 75.92 | 81.41 | 83.40 | 83.14 | 81.75 |
| 85.00 | 80.80 | 78.45 | 78.22 | 78.05 | 77.13 | 79.08 | 74.73 | 77.70 | 80.13 | 84.95 | 85.68 | 82.95 |
| 85.00 | 83.72 | 81.59 | 79.40 | 85.18 | 88.86 | 90.72 | 91.09 | 92.84 | 88.67 | 90.89 | 91.43 | 87.78 |
| 85.00 | 88.73 | 86.41 | 87.13 | 85.18 | 83.12 | 82.18 | 86.43 | 89.59 | 92.62 | 91.76 | 96.13 | 96.86 |
| 85.00 | 81.10 | 84.36 | 80.53 | 85.21 | 87.18 | 93.55 | 89.82 | 88.81 | 89.39 | 84.03 | 85.56 | 84.31 |
| 85.00 | 87.30 | 89.43 | 86.59 | 84.69 | 81.48 | 82.39 | 78.53 | 77.85 | 75.91 | 74.97 | 77.15 | 75.39 |
| 85.00 | 83.11 | 81.96 | 81.64 | 80.04 | 77.55 | 74.05 | 78.49 | 77.94 | 75.38 | 76.18 | 75.51 | 75.05 |

FIG. 6A

STORAGE OF STOCHASTIC INFORMATION IN STOCHASTIC INFORMATION SYSTEMS

CROSS-REFERENCE TO RELATED APPLICATIONS

This application claims the benefit of U.S. Provisional Application No. 61/006,300 filed Jan. 4, 2008 and titled "Storage of Trials of Random Variables in a Stochastic Information System," which is hereby incorporated by reference in its entirety for all purposes.

TECHNICAL FIELD

This disclosure relates generally to stochastic information systems and, more particularly, to the storage of stochastic information in such systems.

BACKGROUND

Exemplary stochastic information systems are described in U.S. application Ser. No. 11/168,621 titled "Stochastic Information System" and filed Jun. 27, 2005, and U.S. application Ser. No. 11/346,071 titled "Utilization and Distribution of Stochastic Data" and filed Feb. 2, 2006, each of which is hereby incorporated by reference in its entirety for all purposes.

The basic element of the Stochastic Information Systems is the Stochastic Information Packet (SIP), which contains hundreds or thousands of trials of a random variable to be used in a simulation or stored in a Stochastic Library. When two or more SIPs have been generated so as to preserve the statistical relationships between them, they are said to form a Stochastic Library Unit with Relationships Preserved, or a SLURP.

If each data element in a SLURP is separately stored in a database or in a spreadsheet, then the size of a SLURP may quickly become inefficient, or even unmanageable. Thus, there is a need for improved techniques for storing stochastic information in a stochastic information system.

SUMMARY

In one general aspect, a stochastic information system stores a coherent stochastic model corresponding to an uncertain variable in a data store. The coherent stochastic model is stored in a compressed format. The stochastic information system includes a calculation engine operable to calculate a result by performing a simulation using the coherent stochastic model. In some implementations, the stochastic data is encoded and stored as a single element, such as, for example, a string. The stochastic data may be encoded using a quantizer, which may be configured to exploit gaps in the stochastic data.

In some implementations, the data store includes information usable to perform mean normalization of restored stochastic data. Any compression techniques may be employed including quantization, and lossless compression. Furthermore, stored data may be compressed by encoding repetition to reduce redundancy.

In another general aspect, a method includes receiving stochastic information including values for a plurality of trials for use in a stochastic information system, encoding the stochastic information as a string representing the values for the plurality of trials, and storing the encoded stochastic information for use by the stochastic information system. The step of encoding the stochastic information as a string representing the values for the plurality of trials can be performed by determining a maximum value, determining a minimum value, dividing the range between the minimum value and the maximum value into a plurality of bins, and for each value of the values for the plurality of trials, coding the value based on a corresponding one of the plurality of bins to obtain a representative character and concatenating the representative character to build the string.

The range between the minimum value and the maximum value may be divided for example, into a predetermined number of bins, into bins based on a heuristic, and the like. In some implementations, the range is divided so as to exploit gaps between values. Furthermore, compression may be used to exploit redundancy in the resulting string to further reduce the size of the representation.

In another general aspect, a method includes retrieving a string that is an encoded representation of stochastic information for use in a stochastic information system, restoring the stochastic information using the retrieved string, and using the stochastic information in a stochastic information system. In some implementations, restored stochastic information is modified to normalize statistical properties such as mean.

The details of one or more implementations are set forth in the accompanying drawings and the description below. Other features and advantages will be apparent from the description and drawings, and from the claims.

DESCRIPTION OF DRAWINGS

FIGS. 3A, 3B, 3C, 3D and 3E depict a SIP quantizer technique in a stochastic information system.

FIGS. 6A and 6B show stochastic data representing the value of a stock in an exemplary stochastic information system using a time-dependent uncertain variable.

DETAILED DESCRIPTION

A stochastic information system 100 is an automated decision support system that uses statistical or probabilistic information to model uncertain variables. A stochastic information system 100 may be implemented as described in U.S. application Ser. No. 11/168,621 filed Jun. 27, 2005 and titled "Stochastic Information System", which is hereby incorporated by reference in its entirety for all purposes.

Figure 1:
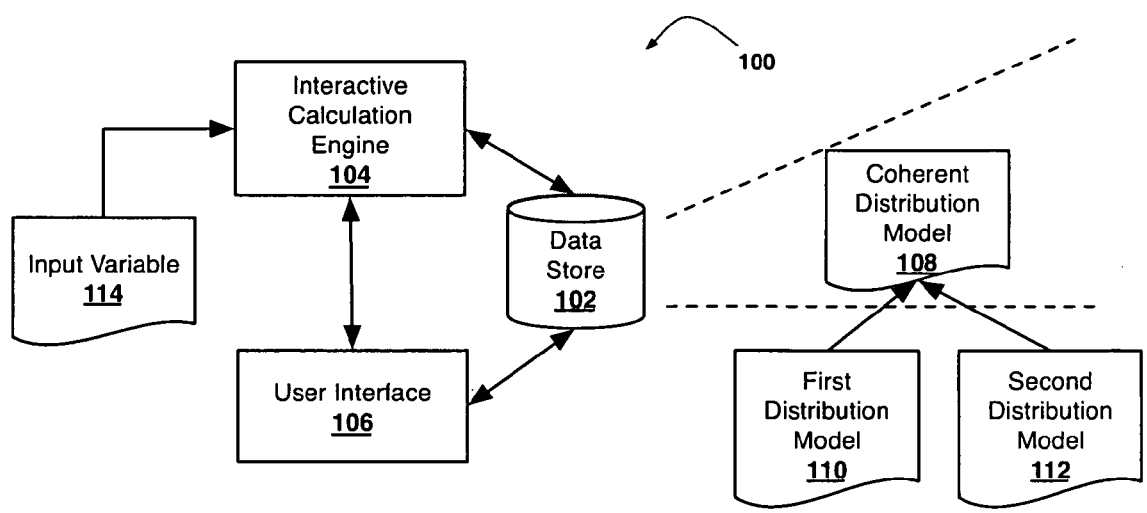
FIG. 1 is a block diagram of an exemplary stochastic information system.

Referring to FIG. 1, a stochastic information system 100 includes a data store 102, an interactive calculation engine 104, and a user interface 106. The data store 102 includes a coherent stochastic model 108 that includes stochastic information for a first uncertain variable and stochastic information for a second uncertain variable. The stochastic information for the uncertain variables may be created using a first distribution model 110 corresponding to the first uncertain variable, and a second distribution model 112 corresponding to the second uncertain variable. The interactive calculation engine 104 calculates a result by performing a simulation using calculation engine inputs, including: the coherent stochastic model 108, and an input variable 114. Finally, the user interface 106 is associated with the interactive calculation engine 104 and facilitates modification of the input variable 114 and display of the result, such that the result is automatically recalculated when the input variable 114 is modified. Each component may be implemented using any combination of the techniques described herein or any additional manner now known or later developed.

Figure 2:
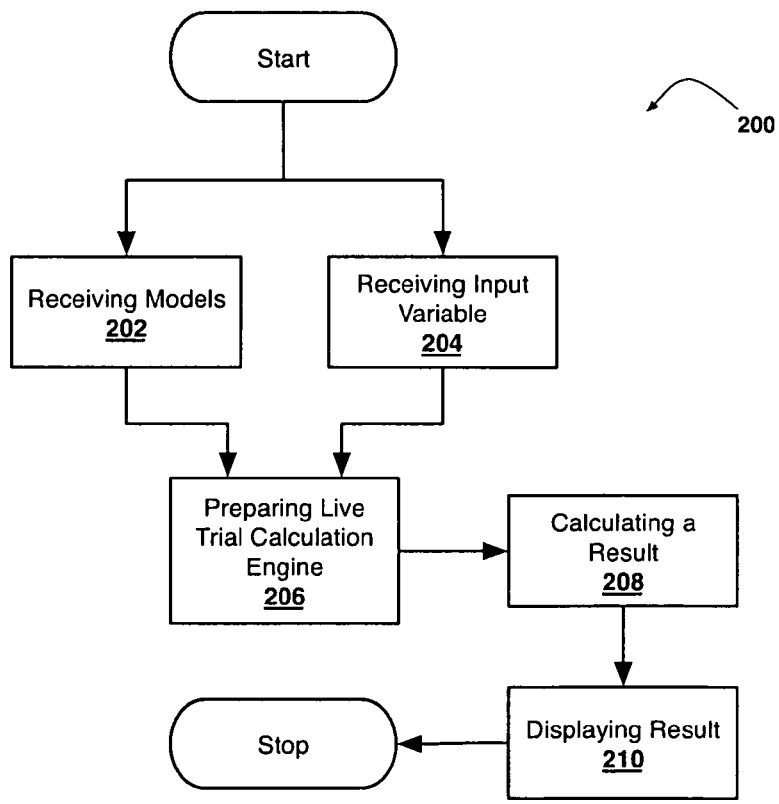
FIG. 2 is a flow chart of a method used in a stochastic information system.

Referring to FIG. 2, the stochastic information system 100 of FIG. 1 may be used to implement a method 200 that includes receiving models corresponding to uncertain variables (step 202), receiving a known input variable (step 204), preparing a live trial calculation engine using the received models and the known input variable (step 206), calculating a result using the live trial calculation engine (step 208), and displaying the result (step 210). The received models include one or more coherent stochastic models preserving the relationship between distribution models. Each step of the method 200 may be implemented using any combination of the techniques described herein or using any additional manner now known or later developed.

The techniques described herein build on the work of statisticians as well as management scientists, each of whom uses the term "model" in their writings. To a statistician, the term "model" may refer to one or more probability distributions associated with a random variable, defining possible outcomes as well as the likelihood of each outcome. Such a model may be used to calculate the expected value for the associated random variable or to generate a series of exemplary trials which may be used, for example, in a Monte Carlo simulation.

Alternatively, a management scientist may use the term "model" to refer to a spreadsheet model using formulas to allow exploration of various alternatives to assist in business decision-making. A management scientist may employ Monte Carlo simulation to calculate possible outcomes in a spreadsheet model. Throughout this document, we refer to the "term" model broadly as defined by the American Heritage Dictionary as "[a] schematic description of a system, theory, or phenomenon that accounts for its known or inferred properties and may be used for further study of its characteristics." *American Heritage Dictionary of the English Language*, Houghton Mifflin Company (2004). Thus, both uses of the term "model" fall within our definition.

Creating coherent distribution models 108 that have sufficient predictive ability is not an easy task. In fact, many companies rely on statisticians with advanced mathematical training and experience to operate their decision support systems because statisticians have the training and background to calculate dependencies between uncertain variables and to determine appropriate distributions.

As discussed in U.S. application Ser. No. 11/168,621 titled "Stochastic Information System" and filed Jun. 27, 2005, and U.S. application Ser. No. 11/346,071 titled "Utilization and Distribution of Stochastic Data" and filed Feb. 2, 2006, a series of trials may be stored as a Stochastic Information Packet ("SIP"). When two or more SIPs are stored so as to preserve the statistical relationships between them, they are said to form a Stochastic Library Unit with Relationships Preserved ("SLURP"). A SLURP can be used to represent the coherent distribution model 108.

The stochastic information system 100 may comprise a software application operating on a personal computer. For example, the personal computer may be any personal computer having at least 256 megabytes of random access memory (RAM). The personal computer may also comprise a hard drive disk. The personal computer may be coupled to a network providing communications to one or more probability distribution data providers. For example, the network may be implemented using an Internet connection. In one implementation of the stochastic information system 100, simulations are performed by the personal computer. In another implementation of the stochastic information system 100, the personal computer can be ported to the Web and simulations performed by a server. The network may be implemented using a broadband data connection, such as, for example, a DSL or greater connection, such as a T1 or faster connection.

The graphical user interface of the stochastic information system 100 may be displayed on a monitor connected to the personal computer. The monitor may comprise a screen for displaying the graphical user interface provided by the stochastic information system 100. A mouse may be provided for mouse-driven navigation between screens or windows comprising the graphical user interface of the stochastic information system 100. The personal computer may also be connected to a keyboard. The mouse and keyboard may enable a user utilizing the stochastic information system 100 to perform a reliable simulation based on validated, published probability distribution data and generate an array of trials.

Referring to FIG. 3A, a SIP stores the outcome of a series of trials for a random variable. Each trial represents a possible outcome for an uncertain variable; in this case each trial represents the percent change in the S&P 500 over a period of time. These values may be stored in a spreadsheet format, such as that shown in FIG. 3A. With a relatively small number of trials, conventional storage techniques such as databases or spreadsheets may be used; however, with larger numbers of trials, such conventional techniques may prove inadequate. Instead of storing each trial outcome as a separate value, the resulting values can be stored together as a single data element, such as, for example, a string. In the most straightforward implementation, each trial outcome can simply be converted to a result that be concatenated with a string. In this manner, a series of outcomes can be concatenated together to form a string.

For example, each outcome represented in FIG. 3A can be represented as an integer in hex format. If we assume that the only values are integers between 0 and 255, then each integer can be represented using two hex digits, i.e., "123" is represented as "7b", "79" as "4f", "104" as "68", "132" as "84", "98" as "62", "65" as "41", and "144" as "90". Thus, the trials shown in FIG. 3A can be represented as the concatenated string "7b4f6884624190". In this manner, it is possible to reduce the number of stored data elements in a SIP or SLURP.

Any mapping may be used to convert a series of outcomes into a single string value. When fixed-length mappings are used, each outcome value is represented using a fixed number of characters, such as the hexadecimal mapping described above). It would also be possible to map to binary values or any other representation. For example, the outcomes shown in FIG. 3A could simply be mapped to fixed-width decimal representations. In this case, three digits would be necessary. The resulting string would be "123079104132098065144".

Alternatively, a variable-length mapping can be used with each value separated by a field separator character, either predetermined or otherwise specified. For example, a tab character, represented here as "\t" may be used. Using a decimal mapping, the outcomes of FIG. 3A may be mapped to the string "123\t79\t104\t132\t98\t65\t144". One skilled in the art will appreciate that any other mapping technique may be employed, including, for example, Huffman coding, Limpel-Ziv-Welch ("LZW") coding, or any other coding technique.

A one-to-one mapping, such as the hexadecimal mapping discussed above may be sufficient in some implementations; however, this example assumes integers from 0 to 255. However, should an implementation require larger representations (e.g., 128-bit floating-point numbers), the resulting string may become unwieldy.

Referring to FIGS. 3B, 3C, and 3D, in some implementations, it may be desirable to use quantization to compress a range of values to a single value. FIG. 3B shows four bins labeled "A", "B", "C", and "D". By mapping ranges of possible values to these four bins, we can further reduce the size of the resulting string. FIG. 3C identifies ranges corresponding to each of the bins shown in FIG. 3B. In this example, values 65% to 85% are assigned to bin "A", values 85% to 105% are assigned to bin "B", values 105% to 125% are assigned to bin "C", and values 125% to 145% are assigned to bin "D". FIG. 3D shows the corresponding mapping for each trial of FIG. 3A.

In this manner, the trials of FIG. 3A may be represented as the string "CABDBAD" (as shown in FIG. 3E). As with any quantization technique, some information is lost. For example, the string "CANDBAD" may be expanded into trial values using the mean for each corresponding bin, i.e., 75% for A, 95% for B, 115% for C, and 135% for D. Thus, the expanded values are as follows: 115%, 75%, 95%, 135%, 95%, 75%, and 135%. The use of the mean for each range is given by way of example. One skilled in the art will appreciate that many other known or later developed techniques may be employed. Furthermore, one skilled in the art will appreciate that any known or later developed quantization techniques may be used, and that quantization errors may be reduced by increasing the number of bins; however, reducing quantization error by increasing the number of bins may also increase the space needed to represent each value in the resulting string.

Quantization error may also result in changes to various statistical properties of the series of trials, such as, for example, mean, standard deviation, mode, range, and the like. In some implementations it may be desirable to normalize coded data so as to maintain one or more statistical properties. For example, the original 7 trials shown in FIG. 3A exhibit a mean of approximately 106.43%; however, when the coded string in FIG. 3E is converted back to a SIP, the mean is only 103.57%. Mean normalization may be used to correct the mean such that the restored SIP has approximately the same mean as the original SIP. This can be accomplished by storing the original mean and comparing this mean with the mean of the restored SIP. The difference between the mean of the restored SIP and the mean of the original SIP can then be added to each trial to vary the mean of the restored SIP to match that of the original SIP. In the example shown in FIGS. 3A-3E, the mean of the original SIP is approximately 106.43%; however, the mean of the restored SIP is approximately 103.57%. If the original mean is stored such that it may be recalled, then it can be compared to the mean of the restored SIP. The difference of 2.86% (i.e., 106.43%-103.57%) can then be added to each result, such that the restored SIP values are: 117.86%, 77.86%, 97.86%, 137.86%, 97.86%, 77.86%, and 137.86%. With this modification, the mean is normalized to match that of the original SIP. Similarly, it is possible to normalize other statistical measures of the original SIP.

In one implementation of a stochastic information system 100, stochastic information packets (SIPs) are converted to a string as follows:
1. The minimum value MIN and the maximum value MAX are identified.
2. The range of values between MIN and MAX is divided to define a number of equally-sized bins, NUM_BINS.
3. Each trial is mapped to the appropriate bin and the representation for such bin is concatenated to build a result string RESULT.
4. The values for MIN, MAX, and NUM_BINS are stored such that RESULT may be decoded.

Consider, for example, a distribution exhibiting values between 0 and 10 and between 1200 and 2000. Using the method set forth above, we use 255 as the number of bins NUM_BINS, the MIN is 0 and the MAX is 2000. Thus, each bin represents a range of 7.84 (i.e., MAX−MIN/NUM_BINS). However, as the distribution exhibits no values between 10 and 1200, over 150 of the 255 bins are never used. We can improve our representation by representing gaps, such as this in another manner. There are several ways to overcome this problem.

In some implementations, we store, in addition to the MIN, MAX, and NUM_BINS, a description of any gaps in the distribution. For example, if we identify the range between 10 and 1200 as a gap, then we can evenly distribute our bins over the range of 0 to 10 and 1200 to 2000. In this manner, each bin represents a range of 3.18. This is a substantial increase in resolution over the 7.84 discussed above, yet we have not increased the number of bins used.

It is not uncommon for distributions to exhibit gaps. For example, in the oil industry, there is either success or failure. All failures result in zero revenue, whereas suppose the smallest success results in 1000, while the largest possible success is 5000. To improve the resolution of the trials, a modification to the encoding may be used. All values of zero are mapped to a first bin, and the remaining values from 1000 to 5000 are mapped in the remaining bins. As the numbers in the gap between 0 and 1000 need not be represented, this allows extra resolution for the remaining range of 1000 to 5000. Furthermore, this can be generalized to distributions having multiple gaps.

Alternatively, we can divide the representation into multiple strings. For example, the first string could represent the range between 0 and 10 using a small number of bins, and the second string could represent the range between 1200 and 2000 using a larger number of bins. In this manner, we can represent an arbitrary number of gaps in distribution data. This process may be automated in several ways.

In one implementation, distribution values are sorted into numerical order. Then the difference between values are determined. If the difference is above a threshold amount, then a gap is identified. The threshold amount may be set to a predetermined value, or it may be set to a value based on statistical properties of the distribution, such as, for example, the standard deviation. In one implementation, a gap is identified if the difference between sorted values is more than one-half the standard deviation. Many additional ways of handling gaps in distributions will be apparent to one skilled in the art.

Furthermore, some distributions may exhibit repeated values, such as, for example, a SIP modeling a Bernoulli random variable, that is, 1 for success, and 0 for failure. In this case, the distribution is a string of 1's and 0's. When multiple values appear in series (e.g., a series of five 1's), those values can be compressed by representing the number of times that value occurs. For example, the following string of values "111101001110000" can be compressed to four 1's "01", two 0's, three 1's and four 0's. One skilled in the art will appreciate that there are many possible ways to represent this information. In one implementation, a backslash is used with a single digit hexadecimal number to indicate repetitions. Thus, this representation can only show a limited number of repetitions. Thus, the above-referenced string could be rewritten as "1\301001110\3". As this representation uses 2 characters, it only reduces the size of the resulting string with repetitions of more than 3.

Several techniques for improving resolution and compressing representations have been shown; however, one skilled in the art will appreciate that any other known compression and quantization techniques may be used in a stochastic information system 100.

Figure 4:
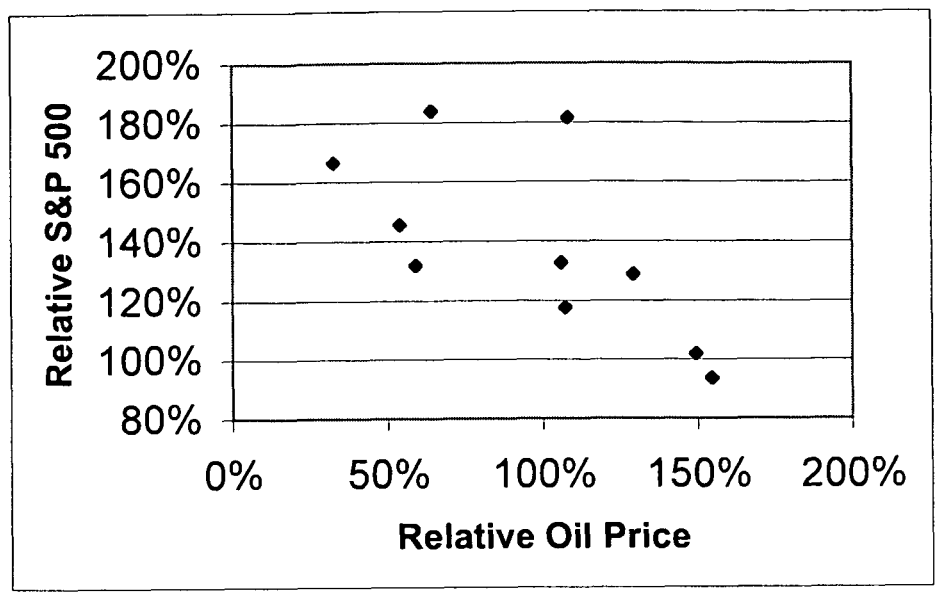
FIG. 4 is a scatter plot of stochastic data that preserves the relationship between relative oil prices and relative S&P 500 indexes.

Referring to FIG. 4, a specific implementation of the stochastic information system may be used to facilitate the analysis of risks, rewards, and expected returns of several different business ventures that depend on two uncertain variables: the price of oil, and the S&P 500 index. To analyze data using these uncertain variables in the stochastic information system, a business analyst may use a coherent stochastic model that preserves the relationship between the variables.

A coherent stochastic model may be created using stochastic information regarding oil prices and the S&P 500 index. Because there is some statistical relationship between these uncertain variables, it is important that they be modeled coherently. To do this, stochastic information is generated for each variable while taking the value of the other variable into account. Table 1 shows stochastic information including 10 hypothetical trials for each of the uncertain variables. This data should be created coherently such that the relationships between the stochastic information for oil prices and S&P 500 indexes is preserved. In this example, each pair of data corresponding to a trial preserves the relationship between the two variables. For example, the pair for trial 1 (106% oil price, 133% S&P 500) preserves the relationship between oil prices and the S&P 500. FIG. 4 is a scatter plot of the data shown in Table 1, illustrating the relationship, which indicates that high oil prices tend to reduce the level of the S&P 500.

TABLE 1

| Trials | Oil Price | SP500 |
| --- | --- | --- |
| 1 | 106% | 133% |
| 2 | 108% | 182% |
| 3 | 129% | 129% |
| 4 | 155% | 94% |
| 5 | 54% | 145% |
| 6 | 64% | 184% |
| 7 | 107% | 117% |
| 8 | 149% | 102% |
| 9 | 33% | 167% |
| 10 | 59% | 132% |

In the previous example, the relationship between Oil Price and the S&P 500 could have been described using the common statistical measure known as correlation. However, the techniques described herein also may be used in a stochastic information system to preserve the relationships that cannot be defined using correlation.

Figure 5:
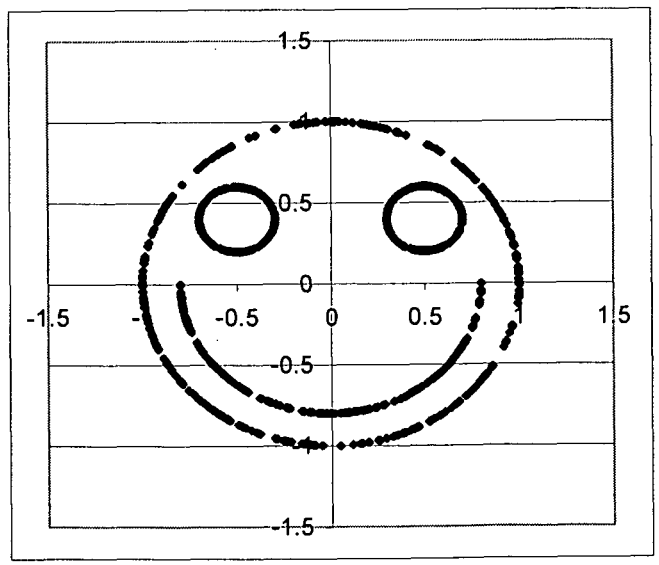
FIG. 5 is a scatter plot of stochastic data that preserves the relationship between two uncertain variables with little or no statistical correlation.

Referring to FIG. 5, Table 2 shows a subset of X and Y data stored in a spreadsheet for which the correlation is 0.031, which is considered to be low. In spite of the low correlation, the data stored in Table 2 is a coherent data set displaying a strong relationship when viewed as a scatter plot as shown in FIG. 5. By packaging 1000 trials as a SLURP, any user may use the variables X and Y in a stochastic information system even though they may not understand or be able to themselves model the relationship between X and Y. Additionally, the SLURP affords consistent, reproducible analysis based on the uncertain variables X and Y.

TABLE 2

| Trials | X | Y |
| --- | --- | --- |
| 1 | 0.3057475 | 0.4476022 |
| 2 | 0.0417314 | 0.999189 |
| 3 | 0.2494753 | −0.968381 |
| 4 | .3003011 | 0.3890303 |
| 5 | −0.30335 | 0.3635489 |
| 6 | 0.284404 | −0.78793 |
| 7 | −0.30055 | 0.4148157 |
| 8 | 0.8575292 | −0.514435 |
| 9 | −0.666407 | −0.745588 |
| 10 | 0.6886552 | 0.4664018 |
| ... | ... | ... |
| 1000 | −0.049785 | −0.99876 |

Using the techniques described above, we can convert each SIP (X and Y) in Table 2 to a string. In a preferred embodiment, we use 255 bins, each represented by corresponding ASCII characters. In some implementations, however, it may be desirable to restrict mappings to certain web-safe and email-safe characters. For example, if only letters, numbers, and symbols are used (i.e., ASCII codes 33 to 126) then this yields 94 different characters. Removing the backslash "\" escape character, yields 93 different values. Thus, in some implementations, it may be desirable to use a maximum of 93 different bins. The number of bins and representation of each bin will, of course, vary based on the desired implementation.

Figure 6B:
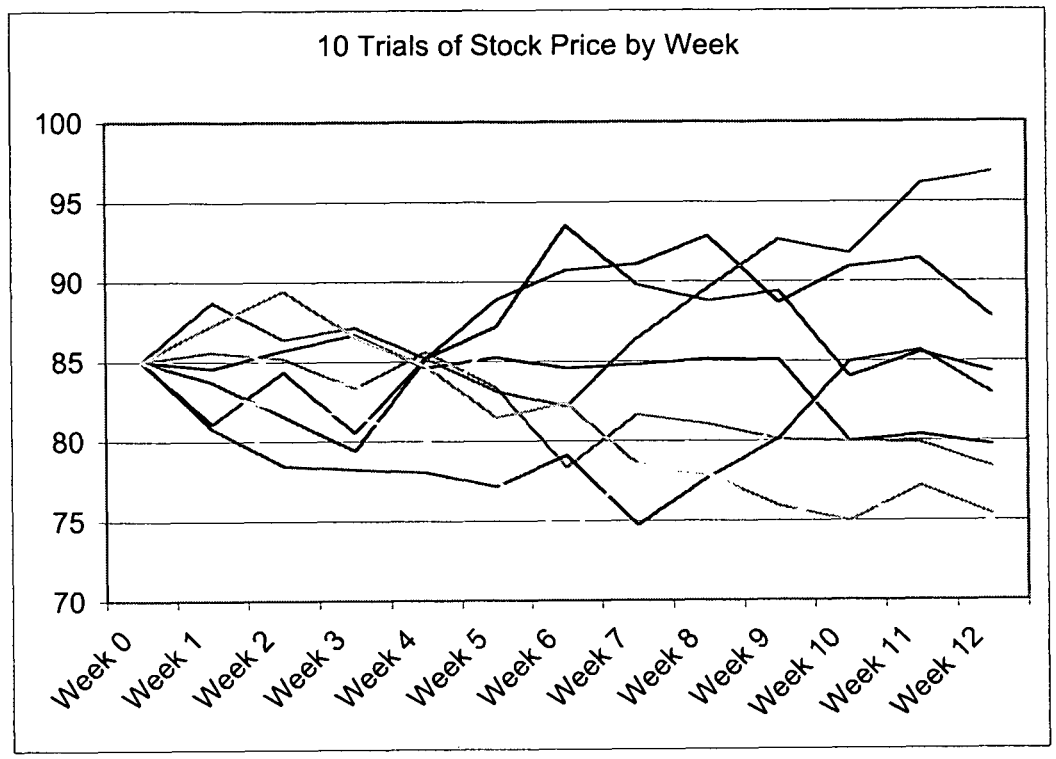

Referring to FIGS. 6A and 6B, a stochastic information system also may be used to model time-dependent uncertain variables. Consider, for example, the price of a stock that varies according to a random walk model. The price of the stock in any time period depends on the price in the previous time period. A single uncertain variable may be modeled using the techniques described herein by simulating various trials over a period of time and using the results of each trial to form the stochastic data corresponding to the uncertain stock price.

In this example, a series of trials are performed assuming an initial stock price of $85.00 as shown in FIG. 6A. Each trial is represented as a row of twelve values in addition to the initial stock price, with each value representing the stock price at a particular point in time. Each value in a trial is obtained by simulating a random walk with each price in any time period depending on the price in the previous time period. For purposes of explanation, only 10 trials (or trajectories) are shown in FIG. 6A; however, any number of trials may be used, such as, for example, 1,000 trials. FIG. 6B is a graphical representation of the trials shown in FIG. 6A.

FIGS. 6A and 6B represent stochastic data corresponding to an uncertain stock price variable. Consider, for example, a stochastic information system used to evaluate the risk and expected value of a derivative instrument whose value depends on the uncertain stock price variable of FIG. 6A, such as, for example, a European Put Option with a maturity of 12 weeks with a strike price of $82.00. The value of the European Put Option is $0.00 if the underlying stock price is equal to or greater than the $82.00 strike price. If the underlying stock price falls below $82.00, then the value of the European Put Option is $82.00 less the stock price. This relationship can be expressed as a structural model, $$=IF(\text{Final Price} < \text{Strike then Strike} - \text{Final Price else } 0,$$

which is calculated for each trial. In this stochastic information system, the model is created by placing the data shown in FIG. 6A in a spreadsheet application and augmenting the data with an additional column, implementing the structural model. The following table shows the additional column.

TABLE 3

| Trial | 12 Week Put | Stock Price Week 12 |
|---|---|---|
| 1 | 2.266 | 79.734 |
| 2 | 3.655 | 78.345 |
| 3 | 0 | 83.27 |
| 4 | 0.252 | 81.748 |
| 5 | 0 | 82.954 |
| 6 | 0 | 87.783 |
| 7 | 0 | 96.856 |
| 8 | 0 | 84.305 |
| 9 | 6.61 | 75.390 |
| 10 | 6.95 | 75.049 |

Figure 7:
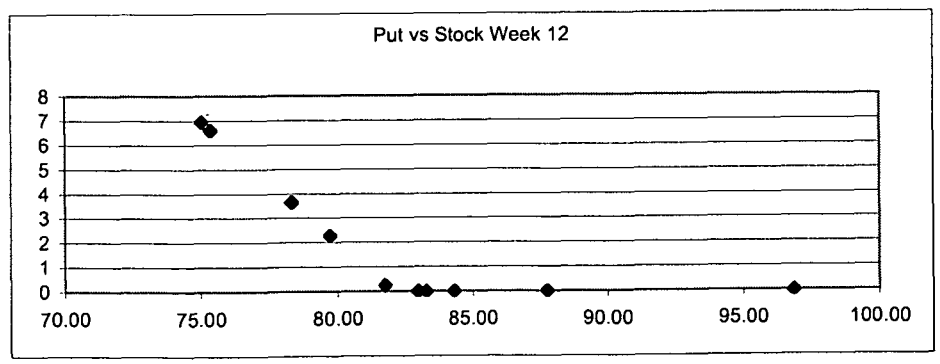
FIG. 7 is a scatter plot of stochastic data applied to a structural model in an exemplary stochastic information system representing the value of put options versus the uncertain value of an underlying stock.

FIG. 7 shows the value of the European Put Option versus the value of the underlying stock at week 12. A stochastic information system incorporating stochastic data and structural models such as that shown above may be used to facilitate the analysis and evaluation of risks and potential returns in a consistent manner by all those using the same stochastic data for all uncertain variables (in this case, stock price).

Once stochastic information has been created that preserves this relationship, it may be packaged for distribution within an organization or published and sold to others. By packaging stochastic information coherently, a business analyst may use the stochastic information system without fully understanding the relationships between uncertain variables.

The examples discussed above assume an equal probability for each trial. In other words, if there are 1000 trials, then each trial is considered just as likely as the others. In many situations, this is more than adequate; however, consider a distribution where the chance of an event happening is 0.1%. If only 1000 trials are used, there is a decent chance that such an event may not even be represented at all. If the occurrence of this event has a great impact, then the model could entirely fail to capture the real risk profile.

In such a situation, it may be useful to employ a technique sometimes referred to as importance sampling. When using importance sampling, each trial is not weighted equally. For example, in the case of a catastrophic event happening 0.1% of the time, 100 of 1000 trials could represent the case when the even occurs and the remaining 900 trials could represent the case where the event does not occur. Metadata may be added to the stochastic information such that a system using the model may appropriately weight the results. In other words, the 1000 trials over-represent the occurrence of the catastrophic event by a factor of 100, so any use of such trials should be adjusted to account for this difference. Additionally, the 1000 trials under-represent the non-occurrence of the catastrophic event and the use of the 900 trials in this category should be augmented accordingly.

The stochastic information systems described above describe stochastic data in a tabular format so that it may be easily implemented in a conventional spreadsheet. One skilled in the art will understand that stochastic data may be represented in any other form such that coherence is preserved. In addition, stochastic data may become more complex as additional variables are added. For example, a three-dimensional data structure may be used to represent coherent trials of two variables wherein one or more of the variables is time-dependent.

The techniques discussed above allow a domain and/or technical expert, such as, for example, a statistician, economist, consultant, etc., to develop distributions corresponding to uncertain variables. Using domain expertise and technical expertise, the expert can model any dependencies and package the result for distribution to any consumer. To control distribution and use, any digital rights management techniques may be employed. For example, data may be encrypted, digitally signed, or otherwise modified to identify origination and/or to control distribution or use.

A number of implementations have been described. Nevertheless, it will be understood that various modifications may be made without departing from the spirit and scope of the invention. Accordingly, other implementations are within the scope of the following claims.

What is claimed is:

1. A stochastic information system comprising:
a processor;
a data store including a coherent stochastic model providing stochastic data for a first uncertain variable, the stochastic data stored in a compressed format;
a calculation engine operable to calculate a result by performing a simulation using calculation engine inputs, the calculation engine inputs including the coherent stochastic model and an input variable;
wherein the stochastic information system restores stochastic information;
wherein the coherent stochastic model preserves relationships between uncertain variables;
wherein the result of the simulation is automatically recalculated when the input variable is modified; and
wherein the data store includes information to perform mean normalization of restored stochastic data by adding the difference between the mean of the restored data and the mean of the provided stochastic data to some of the restored stochastic data.

2. The stochastic information system of claim 1, wherein the stochastic data is encoded and stored as a single element.

3. The stochastic information system of claim 1, wherein the stochastic data is encoded and stored as a string.

4. The stochastic information system of claim 1, wherein the stochastic data is encoded using a quantizer.

5. The stochastic information system of claim 4, wherein the quantizer exploits gaps in the stochastic data.

6. The stochastic information system of claim 1, wherein the stochastic data is stored in a compressed format using lossless compression.

7. The stochastic information system of claim 1, wherein the stochastic data is stored in a compressed format using a compression technique to encode repetition.

8. A method comprising:
receiving stochastic information for use in a stochastic information system, the stochastic information including values for a plurality of trials;
encoding the stochastic information as a string representing the values for the plurality of trials; and
storing the encoded stochastic information for use by the stochastic information system;
calculating a result by performing a simulation using a coherent stochastic model and an input variable;
restoring stochastic information using a retrieved string;
preserving relationships between uncertain variables
automatically recalculating the result of the simulation when the input variable is modified; and performing mean normalization by adding the difference between the mean of the restored data and the mean of the provided stochastic data to some of the restored data.

9. The method of claim 8, wherein the step of encoding the stochastic information as a string representing the values for the plurality of trials includes:
   determining a maximum value of the values for the plurality of trials;
   determining a minimum value of the values for the plurality of trials;
   dividing the range between the minimum value and the maximum value into a plurality of bins;
   for each value of the values for the plurality of trials, coding the value based on a corresponding one of the plurality of bins to obtain a representative character and concatenating the representative character to build the string.

10. The method of claim 9, wherein the range between the minimum value and the maximum value is divided into a predetermined number of bins.

11. The method of claim 9, wherein the range between the minimum value and the maximum value is divided into a number of bins based on a heuristic.

12. The method of claim 9 further comprising:
   exploiting redundancy in the string to further reduce the size of the string representing the values for the plurality of trials.

13. The method of claim 9, wherein dividing the range between the minimum value and the maximum value into a plurality of bins is performed so as to exploit gaps.

14. A method comprising:
   retrieving a string that is an encoded representation of stochastic information for use in a stochastic information system, the stochastic information including values for a plurality of trials;
   restoring the stochastic information using a retrieved string;
   calculating a result by performing a simulation using a coherent stochastic model and an input variable;
   preserving relationships between uncertain variables;
   automatically recalculating the result of the simulation when the input variable is modified; and
   normalizing the mean of the restored stochastic information by adding the difference between the mean of the restored data and the mean of the stochastic data to some of the restored stochastic data.

15. A stochastic information system comprising:
   a processor;
   a data store including a coherent stochastic model providing stochastic data for a first uncertain variable, the stochastic data stored in a compressed format;
   a calculation engine operable to calculate a result by performing a simulation using calculation engine inputs, the calculation engine inputs including the coherent stochastic model and an input variable;
   wherein the data store includes information to perform mean normalization of restored stochastic data by adding the difference between the mean of the restored data and the mean of the provided stochastic data to some of the restored stochastic data;
   wherein the stochastic information system restores stochastic information;
   wherein the coherent stochastic model preserves relationships between uncertain variables;
   wherein the result of the simulation is automatically recalculated when the input variable is modified.

16. The stochastic information system of claim 15, wherein the stochastic data is encoded and stored as a single element.

17. The stochastic information system of claim 15, wherein the stochastic data is encoded and stored as a string.

18. The stochastic information system of claim 15, wherein the stochastic data is encoded using a quantizer.

19. The stochastic information system of claim 18, wherein the quantizer exploits gaps in the stochastic data.

20. The stochastic information system of claim 15, wherein the stochastic data is stored in a compressed format using lossless compression.

21. The stochastic information system of claim 15, wherein the stochastic data is stored in a compressed format using a compression technique to encode repetition.

* * * * *